J. J. MEYER.
VALVE.
APPLICATION FILED JAN. 30, 1912.
1,055,778.
Patented Mar. 11, 1913.
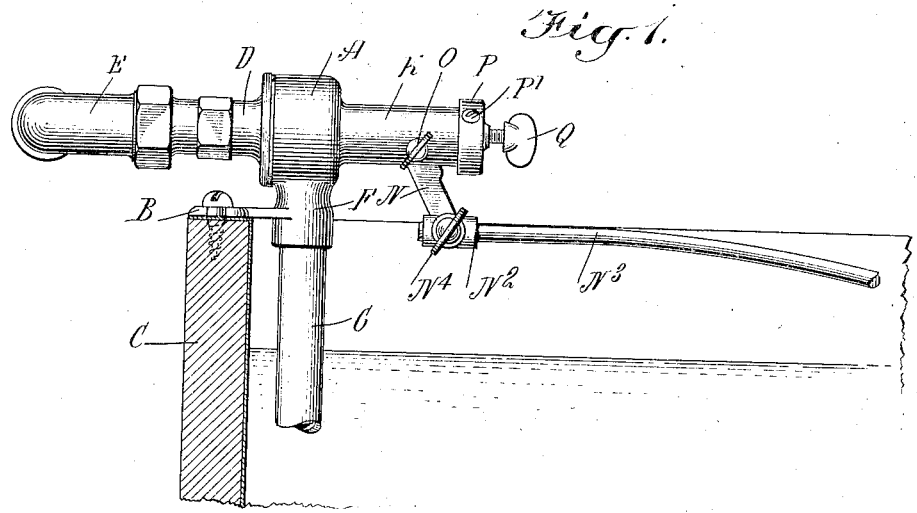
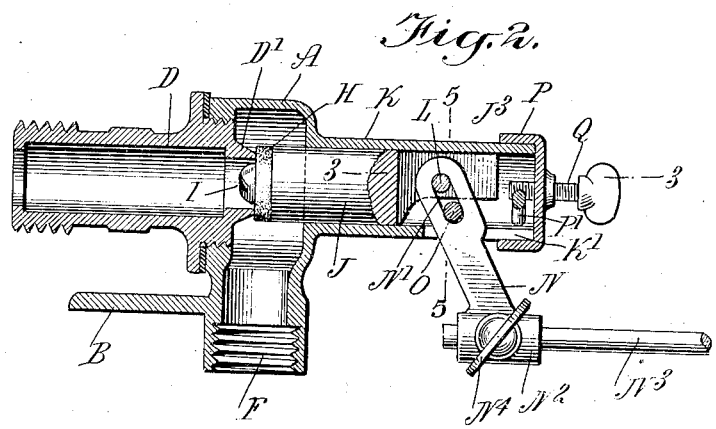
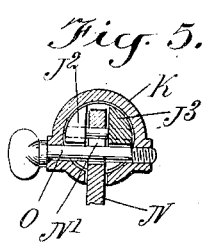
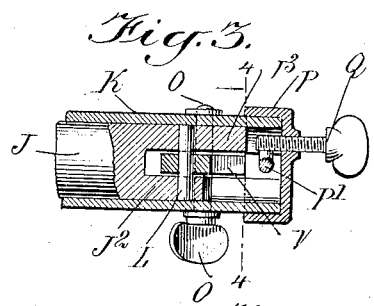
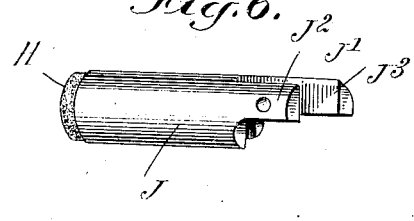
WITNESSES
INVENTOR
John J. Meyer
BY
ATTORNEYS

UNITED STATES PATENT OFFICE.

JOHN J. MEYER, OF YONKERS, NEW YORK.

VALVE.

1,055,778.  Specification of Letters Patent.  Patented Mar. 11, 1913.

Application filed January 30, 1912. Serial No. 674,236.

*To all whom it may concern:*

Be it known that I, JOHN J. MEYER, a citizen of the United States, and a resident of Yonkers, in the county of Westchester and State of New York, have invented a new and Improved Valve, of which the following is a full, clear, and exact description.

The invention relates to that type of valves used in flushing tanks and similar devices and commonly called ball cocks.

The object of the invention is to provide a new and improved valve of this type and which is very simple and durable in construction, not liable easily to get out of order, and arranged for use as a stop cock in case it is desired to completely shut off the supply of water from the flushing tank or other similar device.

For the purpose mentioned use is made of a valve body provided with a valve seat, a valve disk for engagement with the said seat and having its stem mounted to slide in the said valve body, and a lever having a slot engaged by the pivot pin of the lever and by a pin on the said valve stem, the said pivot pin being arranged in the wall of the valve body. Use is also made of a screw screwing in the valve body for forming a stop for the valve disk and for moving the stem into closed position on the valve seat and locking it in this closed position.

A practical embodiment of the invention is represented in the accompanying drawings forming a part of this specification in which similar characters of reference indicate corresponding parts in all the views.

Figure 1 is a side elevation of the valve arranged as a float-controlled supply valve for the top of a flushing tank, the latter being shown in section; Fig. 2 is an enlarged sectional side elevation of the same; Fig. 3 is a sectional plan view of part of the stem on the line 3—3 of Fig. 2; Fig. 4 is a cross section of the same on the line 4—4 of Fig. 3; Fig. 5 is a similar view of the same on the line 5—5 of Fig. 2; and Fig. 6 is a perspective view of the valve disk and its stem.

The valve body A is provided with a flange B for fastening the valve body to a flushing tank C or other device, and on the said valve body is screwed or otherwise secured an inlet D connected with a pipe E leading to a source of water supply. The bottom of the valve body A is provided with an outlet F in which is secured a pipe G extending down into the tank C to supply the latter with water. A valve seat D' is arranged on the inner end of the inlet D, and the said valve seat D' is adapted to be engaged by a valve disk H fastened by a screw or other fastening device I to the inner end of a valve stem J mounted to slide in a bearing K forming part of the valve body A and arranged in axial alinement with the valve seat D'. The outer end J' of the valve stem J is forked, and the forked members J², J³ are cut out on the under side and are provided with a transverse pin L extending through a slot N' formed in a float lever N pivoted on a pivot pin O removably secured in the wall of the bearing K and extending through the slot N', as plainly shown in Fig. 2. By providing the forked members J², J³ with a cut-out portion on the under side sufficient room is had for the passage of the pivot pin O to allow free forward and backward movement of the valve stem J and to permit of securing the pivot pin O in the side walls of the bearing K at a point intermediate the axis of the bearing and the outer surface thereof whereby the said pivot pin O is located in close proximity to the pin L to provide a short leverage at the slotted end of the float lever N, thus rendering the latter exceedingly forcible in pushing the valve disk H to its seat on swinging the float lever N in an upward direction. The lever N extends through a slot K' in the bottom of the bearing K, and the lever N is provided with the usual socket N² engaged by the float rod N³ fastened in place in the socket by a set screw N⁴.

When the valve disk H is in open position, then water flows into the tank C to fill the same and in doing so the float on the end of the float rod N³ rises thus imparting a swinging motion to the float lever N which by its connection with the pin L moves the stem J and consequently the valve disk H inwardly until the valve disk H finally engages the seat D' and closes the same thus shutting off the supply of water to the tank C. When the water level in the tank C falls then a downward swinging motion is given to the float lever whereby the valve stem J and the valve disk H are moved in an outward direction and the valve disk uncovers the valve seat D' to allow water to pass through the valve into the tank C, as before explained. The outer end of the bearing K is closed preferably by a cap P fastened in place by a screw P', and on the said cap screws a screw Q arranged longitudinally and in alinement with the forked member J³ so that when the disk H is moved into open position by the action of the float lever then the opening movement of the disk H and that of the stem J is limited by the screw Q. By screwing the screw further in or further out the valve disk H is allowed to open more or less as desired. When it is desired to shut off the supply of water to the tank C then the operator screws the screw Q inward thus moving the stem J and consequently the valve disk H inward until the valve disk H is firmly seated on the seat D', and when this takes place the water is shut off from the tank C and the plumber or other person can make repairs connected with the tank C.

From the foregoing it will be seen that by the arrangement described the screw Q not only serves as a limiting stop for the stem J and the valve disk H but it also serves to completely close or seat the valve disk H on the seat D' and to hold the same locked in this closed position until the desired repairs on the tank or connected parts have been made. When this has been done the screw Q is again screwed outward to allow the valve disk H and its stem J to slide freely in the valve body A for opening and closing the seat D'.

The valve shown and described is very simple and durable in construction and is composed of comparatively few parts not liable easily to get out of order, and which can be readily repaired whenever necessary. It will also be noticed that by the use of the screw Q the valve disk H can be moved into closed position and completely shut off the supply of water.

Having thus described my invention, I claim as new and desire to secure by Letters Patent:

1. A valve, comprising a valve body provided with a seat and with a tubular bearing, the outer end of the said tubular bearing having a slot at the under side, a valve disk having a stem mounted to slide in the said bearing, the disk being adapted to open and close the said seat, a lever extending through the said bearing slot and provided with a closed slot, a transverse pivot pin removably held on the said bearing and having its axis extending within the bore of the bearing intermediate the axis of the bearing and the inner surface of the bearing, the pivot pin also extending through the said closed slot, and a pin on the said valve stem and engaging in the said closed slot.

2. A valve, comprising a valve body having a seat and a tubular bearing, the outer end of the said tubular bearing having a slot at the under side, a valve disk having a stem mounted to slide in the said tubular bearing, the valve disk being adapted to open and close the said seat, the said stem being provided at its outer end with a cut-out portion, a float lever extending through the said bearing slot and having one end provided with a closed slot, a transverse pivot pin for the said float lever and removably held on the said bearing, the said pivot pin extending through the said closed slot and through the said cut-out portion of the stem, the said pivot pin having its axis arranged within the bore of the said bearing intermediate the axis of the bearing and the inner surface of the bearing, and a pin on the end of the said stem and extending through the said closed slot.

3. A valve, comprising a valve body having a seat and a tubular bearing, the outer end of the said tubular bearing having a slot at the under side, a valve disk having a stem mounted to slide in the said tubular bearing, the said valve disk being adapted to open and close the said seat, the outer end of the said stem being forked and cut out at the under side, a float lever extending through the said bearing slot and having one end provided with a closed slot, a pivot pin removably held in the wall of the bearing and extending through the said closed slot and through the cut-out portion of the valve stem, the said pivot pin having its axis arranged within the bore of the said bearing intermediate the axis of the bearing and the inner surface of the bearing, and a pin on the forked end of the stem and extending through the said closed slot.

4. A valve, comprising a valve body provided with a valve seat and with a tubular bearing, the outer end of the said tubular bearing having a slot at the under side, a valve disk adapted to engage the said valve seat and having a stem slidable in the said bearing, a float lever extending through the said bearing slot into the said bearing and engaging the said stem, and a pivot pin for the float lever to swing on, the said pivot pin being removably held on the said tubular bearing and its axis being within the bore of the bearing intermediate the axis of the bearing and the inner surface of the bearing.

In testimony whereof I have signed my name to this specification in the presence of two subscribing witnesses.

JOHN J. MEYER.

Witnesses:
THEO. G. HOSTER,
PHILIP D. ROLLHAUS.